US012570023B1

(12) United States Patent
Wang

(10) Patent No.: US 12,570,023 B1
(45) Date of Patent: Mar. 10, 2026

(54) PUSHBLOCK WITH CENTER TUNNEL

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 19/189,499

(22) Filed: Apr. 25, 2025

(51) Int. Cl.
*B27B 25/10* (2006.01)
*B27B 25/06* (2006.01)

(52) U.S. Cl.
CPC .............. *B27B 25/10* (2013.01); *B27B 25/06* (2013.01)

(58) Field of Classification Search
CPC ......... B23Q 3/007; B27B 25/06; B27B 25/10; B27B 27/10; B23D 47/045
USPC .................................... D8/14; 83/446, 436.2
See application file for complete search history.

(56) References Cited

U.S. PATENT DOCUMENTS 1,059,545 A * 4/1913 Kunze ..................... B25B 5/163 269/258
1,203,152 A * 10/1916 Steudner ................. B25B 5/163 279/123
1,745,815 A * 2/1930 Schoepfle ............... B65B 61/06 269/291
2,895,513 A 7/1959 Cowley
3,807,269 A * 4/1974 Mertes ................... B23Q 3/007 83/522.19
4,206,910 A * 6/1980 Biesemeyer ............ B27B 27/02 83/438
4,370,909 A * 2/1983 Jennings ................ B27G 19/02 D15/138
4,638,564 A * 1/1987 Burrows ................ B23Q 3/007 83/745
5,161,789 A * 11/1992 Rogers .................... B25B 5/003 269/42
D342,658 S 12/1993 Gakhar
5,722,308 A * 3/1998 Ceroll ..................... B27B 27/02 144/287
6,619,347 B2 * 9/2003 Jukoff ....................... B27C 5/06 83/450
6,732,623 B1 5/2004 Jennings
6,739,075 B2 * 5/2004 Sizemore ............. A43C 15/168 36/61
7,040,206 B2 5/2006 Wang
7,540,224 B2 * 6/2009 Wang ........................ B27C 5/06 83/438
9,707,694 B2 * 7/2017 Wang ...................... B27B 25/10
10,011,037 B2 7/2018 Wang
10,226,880 B2 * 3/2019 Bow ...................... B23Q 3/002
D914,474 S 3/2021 Hall
11,465,312 B1 10/2022 Wang
D975,510 S 1/2023 Hall
(Continued)

*Primary Examiner* — Boyer D Ashley
*Assistant Examiner* — Samuel A Davies
(74) *Attorney, Agent, or Firm* — Wolter Van Dyke Davis, PLLC; Robert L. Wolter; Patrick Herron

(57) ABSTRACT

A woodworking pushblock (500), including: a body (502) that extends along a longitudinal axis (508) and handle (504) disposed atop the body. The body includes first leg (506A), a second leg (506B), and a center leg (506C) disposed therebetween. The first leg, the second leg, and the center leg are each configured to abut a top of a workpiece. The first leg and the second leg define a first tunnel (520A) therebetween. The second leg and the center leg define a second tunnel (520B) therebetween. The center leg defines a center tunnel (520C) recessed into a bottom surface (506CBS) thereof and disposed between the first tunnel and the second tunnel.

7 Claims, 9 Drawing Sheets

(56) References Cited

U.S. PATENT DOCUMENTS

| | | | | |
|---|---|---|---|---|
| 11,731,306 | B1 * | 8/2023 | Wang | B27B 27/10 83/438 |
| 12,427,691 | B1 * | 9/2025 | Wang | B27B 25/10 |
| 2002/0170403 | A1 * | 11/2002 | Whiteman | B26D 7/015 83/522.19 |
| 2004/0060411 | A1 * | 4/2004 | Svetlik | B23D 59/001 83/477.2 |
| 2005/0092152 | A1 * | 5/2005 | Wirth | B27B 25/10 83/436.2 |
| 2012/0036974 | A1 * | 2/2012 | Koegel | B27B 25/10 83/438 |

* cited by examiner

PUSHBLOCK WITH CENTER TUNNEL

FIELD OF THE INVENTION

The invention relates to pushblocks used for woodworking. In particular, the invention relates to a pushblock with center leg having a tunnel.

BACKGROUND OF THE INVENTION

Pushblocks allow a user to press down on a top surface of a workpiece to move the workpiece. Frictional contact between the top surface and a bottom surface of the pushblock allows the user to advance the workpiece across a worktable toward a saw blade while keeping hands safe from the saw blade. Some pushblocks further include a heel that drops below the bottom surface and is configured to abut a side of the workpiece. The heel pushes the side of the workpiece to advance the workpiece together with the frictional contact between the top of the workpiece and the bottom of the pushblock.

Generating a push force via friction requires a downward force on the workpiece. This downward force can damage an underside of the workpiece that slides along the worktable. In contrast, the push force generated by heel results from physical interference between the heel and the side and thereby does not require a downward force. Using a heel thereby reduces the chances of damage to the underside of the workpiece. Further, the physical interference associated with the heel provides greater control and can aid in certain instances such as a sudden resistance to the movement of the workpiece across the worktable etc.

However, abutting the heel against the side of the workpiece requires precise positioning of the pushblock along the workpiece. Further, many conventional heels have a flat surface that is configured to abut the side of the workpiece. A ligning the flat surface of the heel with the flat surface of the workpiece requires both the aforementioned proper positioning along the workpiece as well as proper rotational alignment with the workpiece in addition. This process can slow the operation utilizing the pushblock.

In addition, when a pushblock with a fixed heel is not properly positioned along the workpiece and results in the fixed heel being placed on top of the workpiece, the fixed heel will prevent the bottom surface of the push block from resting flush on the top of the workpiece. Instead, the front of the pushblock and the heel at the back of the pushblock will contact the top of the workpiece. This leaves the pushblock tilted forward at an angle that will be determined by the size of the fixed heel. Having only two points of contact between the pushblock and the workpiece, namely the front of the pushblock and the fixed heel, reduces the ability of the pushblock to control the workpiece. The forward tilt of the pushblock results in a forward tilt of the handle, which compromises the operator's safety.

In addition, in pushblocks with a center leg, the center leg is susceptible to being damaged by the saw blade. Hence, there remains room in the art for improvement.

DETAILED DESCRIPTION OF THE INVENTION

The present inventors have devised a unique and innovative pushblock that incorporates a compressible heel that can be partially or fully compressed. When uncompressed, the compressible heel can function as a full heel that protrudes downward below a central region of the pushblock and that can push on a side of a workpiece. When only a portion of the compressible heel is compressed, the portion that is compressed ends up flush with the central region of the pushblock while a remainder that is not compressed forms a secondary compressible heel that can push on a side of a workpiece. When the entire compressible heel is compressed, the entire compressible heel is flush with the central region of the pushblock.

Unlike the prior art pushblocks with heels which must be positioned exactly along the workpiece and rotationally aligned with the workpiece, the compressible heel disclosed herein can conform to a corner of the workpiece and provide a heel function without requiring exact positioning and rotational alignment of the pushblock at the corner of the workpiece. Hence, the pushblock disclosed herein is an improvement over the art.

Figure 1A:
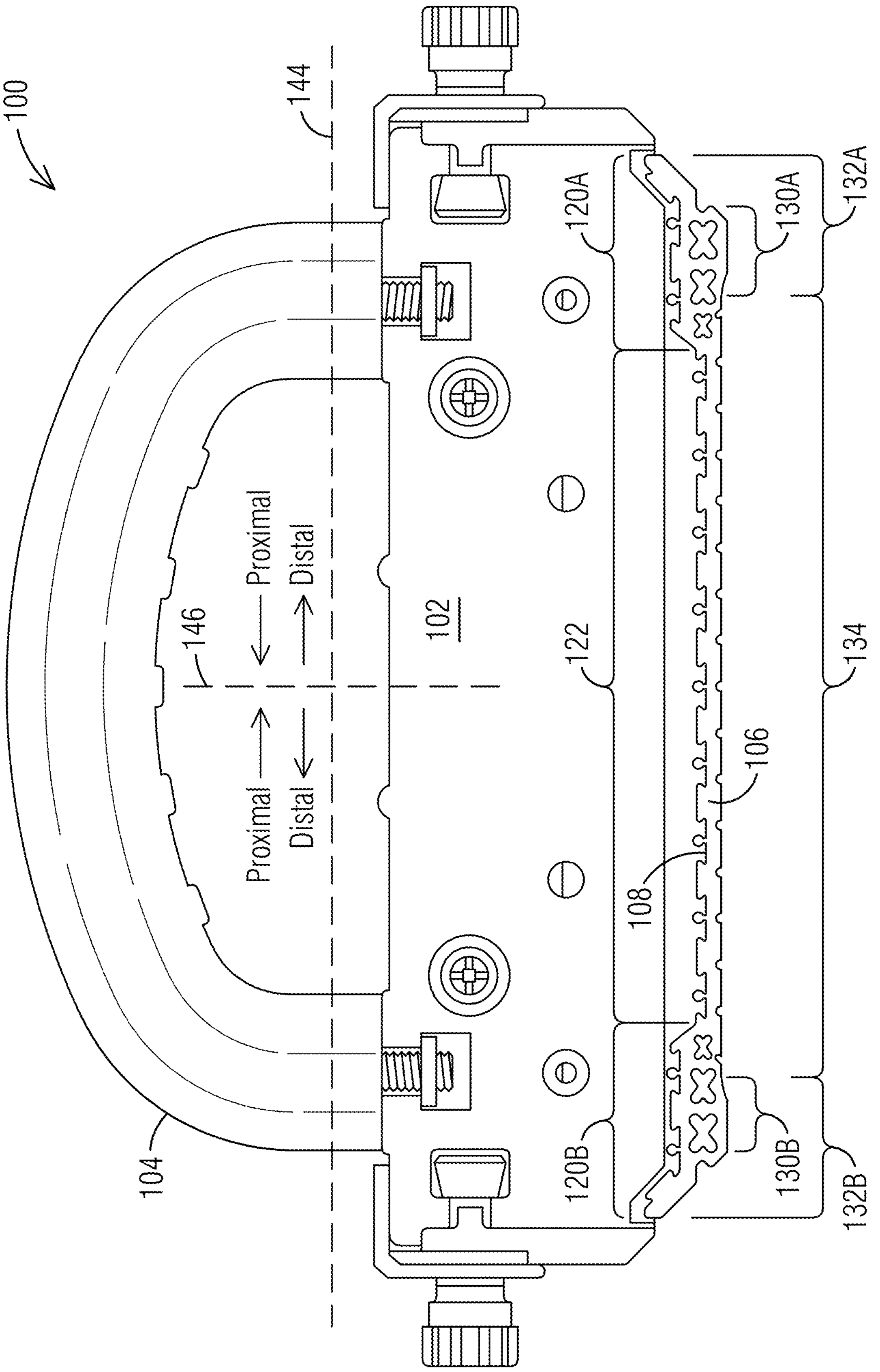
FIG. 1A is a side view of an example embodiment of a pushblock with an example embodiment of a compressible heel.
Figure 1B:
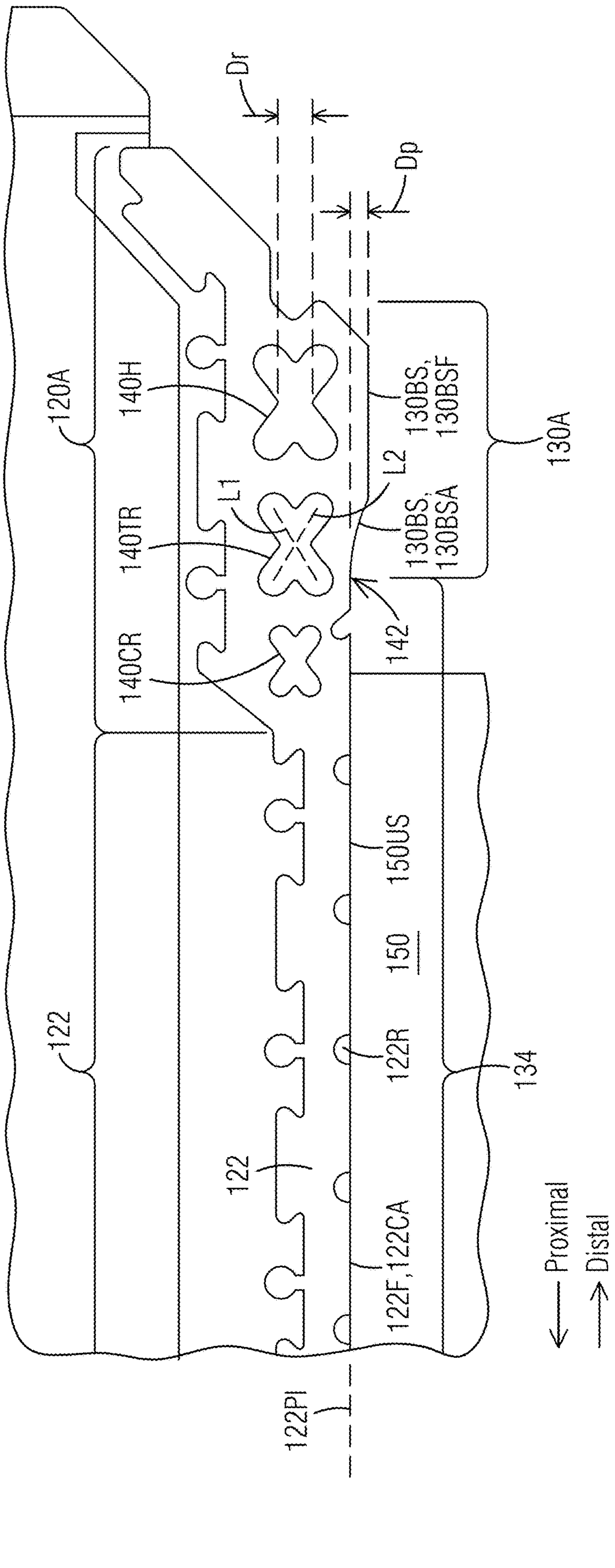
FIG. 1B is a close-up view of the compressible heel of FIG. 1A in an uncompressed state.

As can be seen in FIG. 1A and FIG. 1B, an example embodiment of a woodworking pushblock 100 includes a body 102, a handle 104 disposed atop the body 102, and a pad 106 secured to an underside 108 of the body 102. The pushblock 100 may have one pad 106 or in the case of a pushblock with several legs (see FIG. 4), there may be a respective pad 106 as part of some or part of all of the legs and the pads 106 may or may not be identical. The pad 106 may be composed of a thermoplastic elastomer. Examples include TPE (Thermo-Plastic Elastomer), TPU (Thermo-Plastic Urethane), TPR (Thermo-Plastic Rubber), Urethane Micro-Cellular Foam and similar compressible high friction materials.

The pad 106 includes a relatively thick first portion 120A, a relatively thick second portion 120B, and a relatively thin portion 122 disposed between the relatively thick first portion 120A and the relatively thick second portion 120B. The underside of the body 102 is contoured as shown to receive the pad 106. The relatively thick first portion 120A and the relatively thick second portion 120B may be the same as each other.

The pad 106 further includes a first compressible heel 130A at a first end 132A of the pad 106, a second compressible heel 130B at a second end 132B of the pad 106, and a central region 134 disposed between the first compressible heel 130A and the second compressible heel 130B.

The first compressible heel 130A may be referred to herein simply as the compressible heel 130A. The teachings related to the first compressible heel 130A/compressible heel 130A apply equally to the second compressible heel 130B. The central region 134 is primarily composed of the relatively thin portion 122 but can extend into the relatively thick first portion 120A and the relatively thick second portion 120B.

Each relatively thick first portion 120A, 120B includes a heel relief hole 140H disposed in the compressible heel 130A, 130B, a central region relief hole 140CR disposed in the central region 134, and a transition relief hole 140T disposed in between the heel relief hole 140H and the central region relief hole 140CR. The transition relief hole 140T may span a transition/junction 142 between the central region 134 and the compressible heel 130A.

The central region 134 includes multiple flats 122F separated by recesses 122R. Each flat 122F defines a respective contact area 122CA configured to contact a planar upper surface 150US of a workpiece 150. The contact areas 122CA together define a planar interface 122PI that is likewise configured to contact the planar upper surface 150US of the workpiece 150. Instead of flats 122F, other structures such as dimples, ridges, cones, cups etc. may have respective contact areas that are used to form the planar interface. Alternately, the central region 134 may define one continuous planar contact surface.

The compressible heel 130A has a heel bottom surface 130B S composed of a bottom surface flat portion 130BSF and a bottom surface angled portion 130B SA that connects the planar interface 122PI to the bottom surface flat portion 130BSF. The heel bottom surface 130BS of the compressible heel 130A thereby protrudes below the planar interface 122PI of the central region 134 by a protrusion distance Dp. In an example embodiment, the protrusion distance Dp is 0.042 inches, =/−0.005 inches.

The relief holes 140H, 140TR, and 140CR are configured to collapse upward as the compressible heel 130A yields upward and thereby function as a relief. To help accomplish this, at least the heel relief hole 140H includes a relief dimension Dr. In an example embodiment, the relief dimension Dr is equal to or greater than the protrusion distance Dp.

In the example embodiment shown, each relief hole 140H, 140TR, and 140CR includes an X-shape having two legs L1, L2 that cross each other to form the X-shape. Each leg L1, L2 likewise collapses as the compressible heel 130A yields upward and thereby functions as a respective relief. Each Leg L1, L2 is dimensioned to accommodate the upward movement of the bottom surface flat portion 130BSF of the compressible heel 130A of at least Dp.

The pushblock extends along a longitudinal axis 144. As used herein, a direction parallel to the longitudinal axis 144 toward a central plane 146 of the pushblock 100 is deemed proximal. A distance parallel to the central axis 146 away from the central plane 146 is deemed distal.

All explanations herein related to the first compressible heel 130A and its heel relief hole 140H, its transition relief hole 140T, and its central region relief hole 140CR may apply equally to the second compressible heel 130B and its heel relief hole 140H, its transition relief hole 140T, and its central region relief hole 140CR.

Figure 2A:
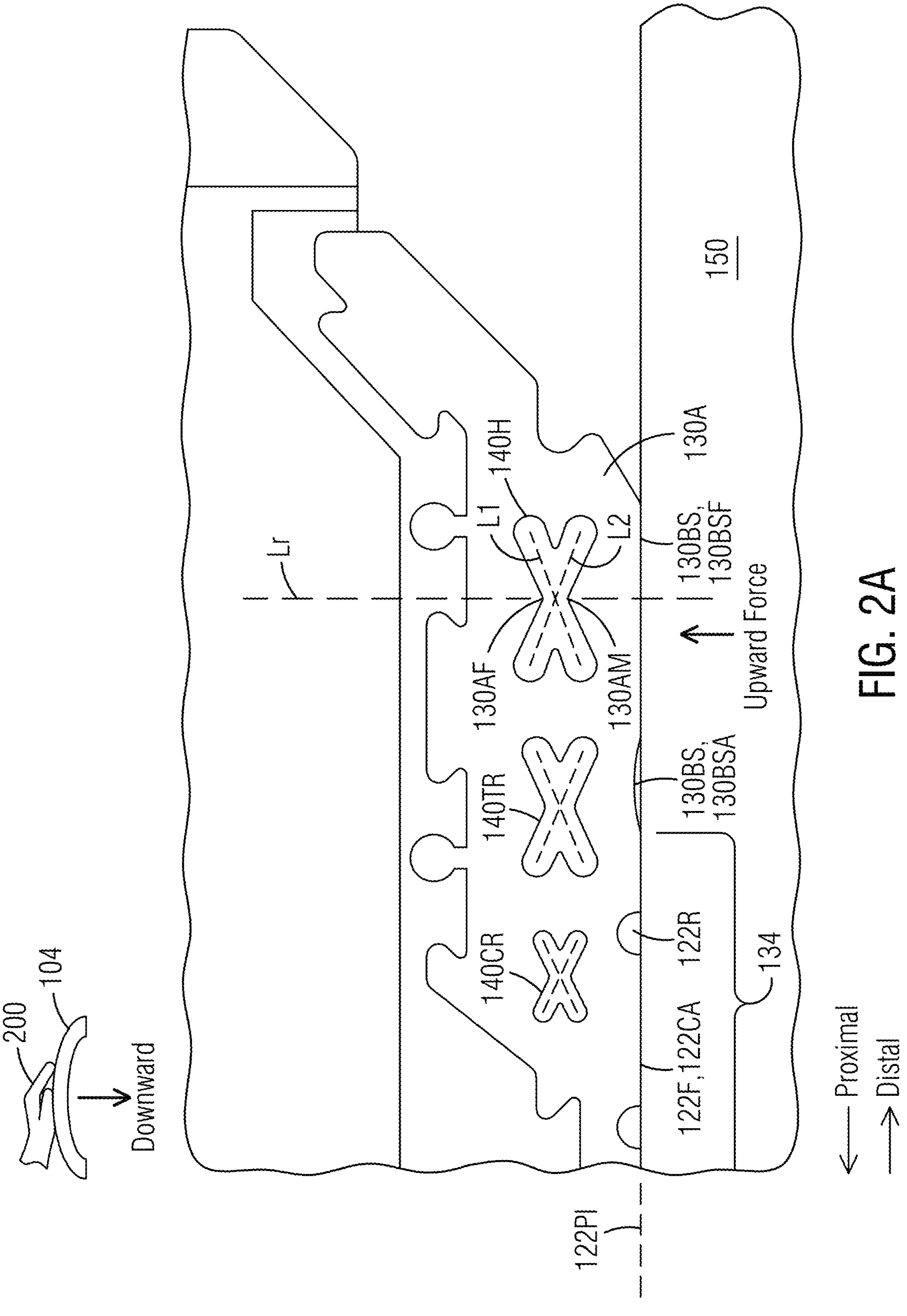
FIG. 2A is a side view of the compressible heel of FIG. 1A yielding upward.
Figure 2B:
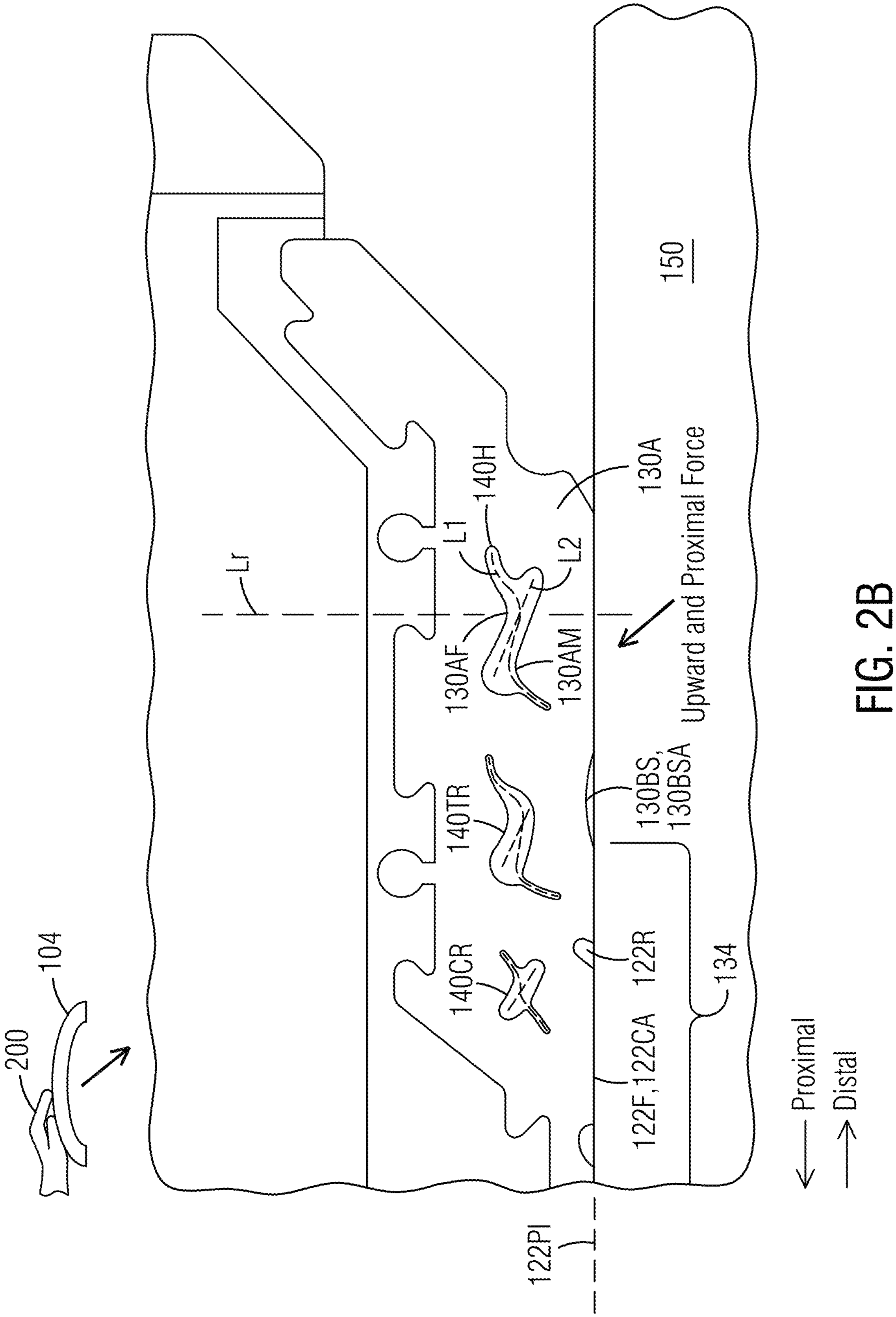
FIG. 2B is a side view of the compressible heel of FIG. 1A yielding proximally.
Figure 2C:
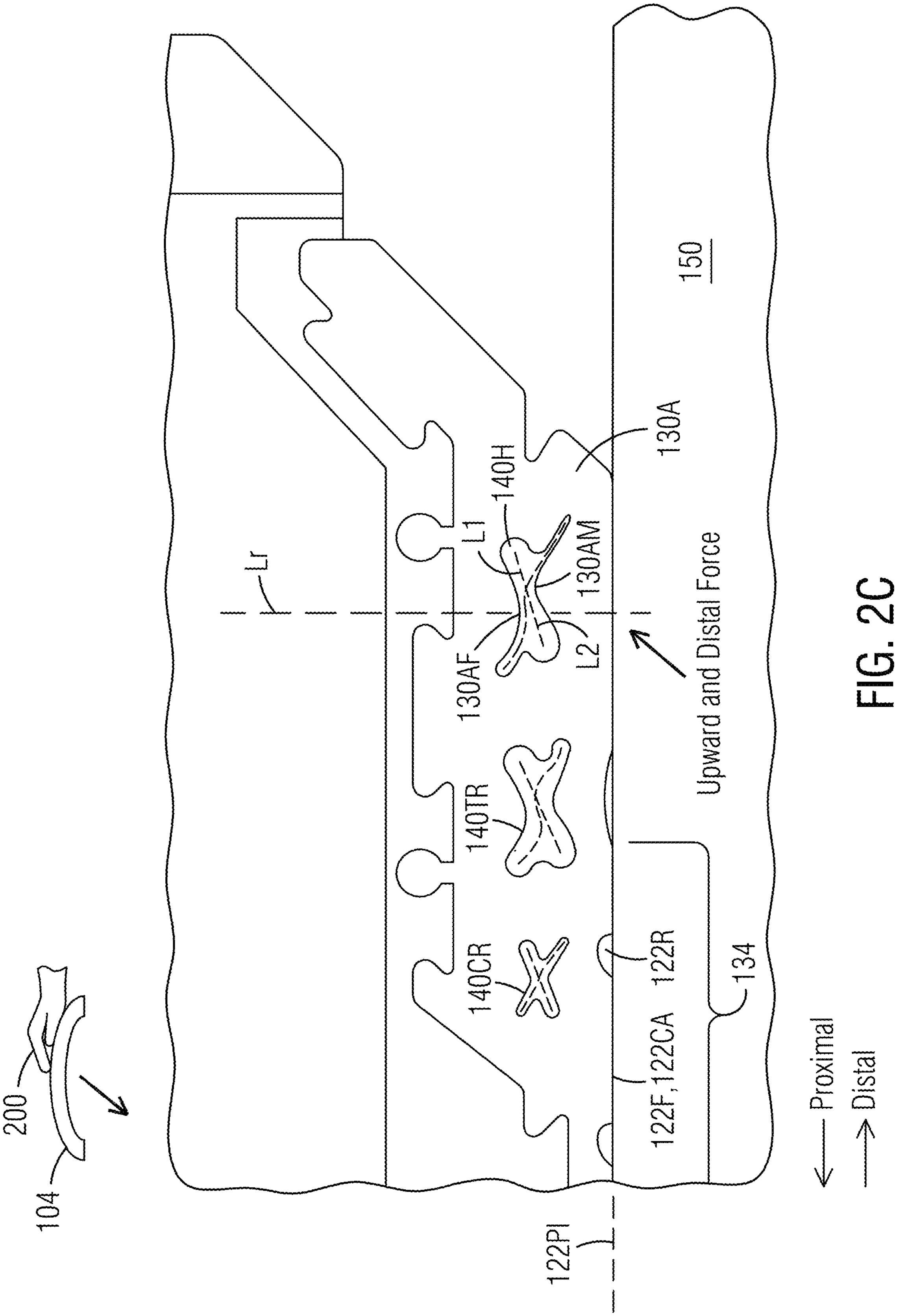
FIG. 2C is a side view of the compressible heel of FIG. 1A yielding distally.

FIG. 2A to FIG. 2C show the compressible heel 130A collapsing upward, collapsing proximally, and collapsing distally respectively. A reference line Lr coincides with a fixed point 130A F of the compressible heel 130A in FIG. 2A to FIG. 2C. The fixed point 130A F is a point that does not move when the heel relief hole 140H collapses. A moving point 130A M of the compressible heel 130A is a point that does move when the heel relief hole 140H collapses. This movement is shown relative to the reference line in FIG. 2A to FIG. 2C.

FIG. 2A shows a hand 200 pressing downward (only) on the handle 104. As a result, a workpiece 150 on which the compressible heel 130A rests exerts a sufficient upward (only) force on the bottom surface flat portion 130BSF of the compressible heel 130A. In response, the compressible heel 130A has yielded upward (only), aided by a collapse of the heel relief hole 140H, the transition relief hole 140T, and the central region relief hole 140CR. The compressible heel 130A has yielded until the compressible heel 130A is flush with the central region 134.

As used herein, to be flush with the central region 134 means the bottom surface flat portion 130B SF (or a portion or a planar interface thereof) to which the upward force is applied ends up flush with the planar interface 122PI of the central region. (The bottom surface angled portion 130B SA may also be flush with the planar interface 122PI or it may arc above the planar interface 122IP to accommodate the yield.) As noted above, the planar interface 122PI of the central region 134 can be planar continuous bottom surface of the central region configured to press on a planar upper surface 150US of workpiece 150. Alternately, where the central region 134 includes multiple features (e.g., flats 122F, pads, cups, dimples, ridges etc.) each having a respective contact area (e.g., 122CA) configured to contact the planar upper surface 150US of the workpiece 150, the interface is a planar interface 122PI defined by the multiple contact areas together (e.g., 122CA). Similarly, the bottom surface flat portion 130B SF of the compressible heel 130A may alternately include multiple features (e.g., flats 122F, pads, cups, dimples, ridges etc.) each having a respective contact area (e.g., 122CA) configured to contact the planar upper surface 150US of the workpiece 150, where the contact areas collectively form a heel planar interface.

In particular, the heel relief hole 140H, the transition relief hole 140T, and the central region relief hole 140CR collapse upward (only) in response to the upward yield of the compressible heel 130A. This can be seen where the moving point 130A M of the heel relief hole 140H has moved vertically upward toward the fixed point 130A F. The same movement occurs in the transition relief hole 140T, and the central region relief hole 140CR to varying degrees. A vertical separation between the moving point 130A M and the fixed point 130A F remains in this example embodiment. In an alternate example embodiment, the moving point 130A M and the fixed point 130A F are configured to abut each other once the compressible heel 130A is flush with the planar interface 122IP and the contact therebetween acts as a positive stop.

In addition, since the moving point 130A M and the fixed point 130AF remain in line with the reference line Lr, each leg L1, L2 remains essentially straight although each moves toward a slightly more horizontal orientation due to their vertical collapse.

FIG. 2B shows the hand 200 pressing downward and rightward on the handle 104. (Note the appropriate location of the hand 200 on the handle 104 is aft of the middle of the handle 104. This location more evenly distributes the forces exerted by the workpiece 150 among the first compressible heel 130A and the second compressible heel 130B.) As a result, a workpiece 150 on which the compressible heel 130A rests exerts a sufficient upward and proximal force on the bottom surface flat portion 130BSF of the compressible heel 130A. In response, the compressible heel 130A has yielded upward and proximally (leftward), aided by a collapse of the heel relief hole 140H, the transition relief hole 140T, and the central region relief hole 140CR. The compressible heel 130A has yielded until the compressible heel 130A is flush with the central region 134.

In particular, the heel relief hole 140H, the transition relief hole 140T, and the central region relief hole 140CR collapse upward and proximally (leftward) in response to the upward and proximate yield of the compressible heel 130A. This can be seen where the moving point 130A M of the heel relief hole 140H has moved vertically upward toward the fixed point 130A F as well as proximately (leftward) relative to the fixed point 130A F and the reference line Lr. The same movement occurs in the transition relief hole 140T, and the central region relief hole 140CR to varying degrees. Very little to no separation remains between the sidewalls of the first leg L1 and the first leg L1 can be configured such that the sidewalls of the first leg L1 abut each other once the compressible heel 130A is flush with the planar interface 112IP and abutting contact therebetween acts as a positive stop.

In addition, since the moving point 130A M moves to the left of the fixed point 130AF, the first leg L1 changes from straight to an undulating shape. However, the second leg L2 remains essentially straight.

FIG. 2C shows the hand 200 pressing downward and leftward on the handle 104. As a result, a workpiece 150 on which the compressible heel 130A rests exerts a sufficient upward and distal force on the bottom surface flat portion 130BSF of the compressible heel 130A. In response, the compressible heel 130A has yielded upward and distally (rightward), aided by a collapse of the heel relief hole 140H, the transition relief hole 140T, and the central region relief hole 140CR. The compressible heel 130A has yielded until the compressible heel 130A is flush with the central region 134.

In particular, the heel relief hole 140H, the transition relief hole 140T, and the central region relief hole 140CR collapse upward and distally (rightward) in response to the upward and distal yield of the compressible heel 130A. This can be seen where the moving point 130A M of the heel relief hole 140H has moved vertically upward toward the fixed point 130A F as well as distally (rightward) relative to the fixed point 130A F and the reference line Lr. The same movement occurs in the transition relief hole 140T, and the central region relief hole 140CR to varying degrees. Very little to no separation remains between the sidewalls of the second leg L2 and the second leg L2 can be configured such that the sidewalls of the second leg L2 abut each other once the compressible heel 130A is flush with the planar interface 112IP and contact therebetween acts as a positive stop.

In addition, since the moving point 130A M moves to the right of the fixed point 130AF, the first leg L1 remains essentially straight. However, the second leg L2 changes from straight to an undulating shape. This is the opposite of what happens to the first leg L1 and the second Leg L2 in FIG. 2B because the movement in FIG. 2B is proximal whereas the movement in FIG. 2C is distal.

While the heel relief hole 140H, the transition relief hole 140T, and the central region relief hole 140CR each have an X-shape in this example embodiments, other relief hole shapes that can collapse upward, upward and proximal, and upward and distal are likewise suitable. Example other relief hole shapes include circular, oval, star, and rectangular etc.

Figure 3A:
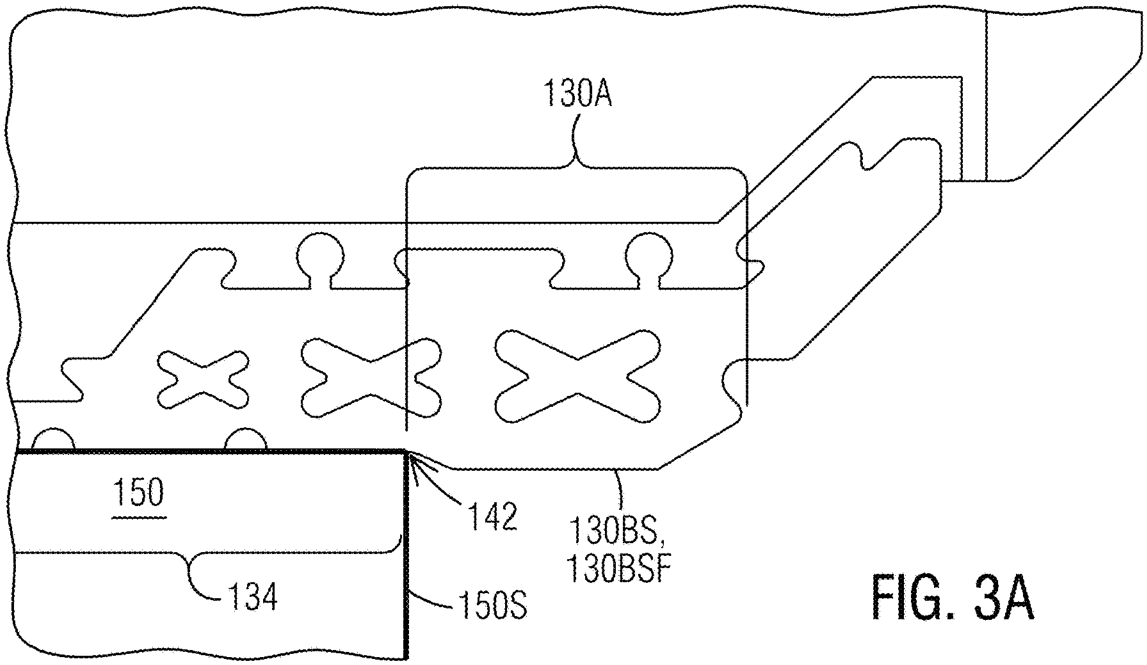
FIG. 3A is a side view of the compressible heel of FIG. 1A in the uncompressed state and acting as a heel.

FIG. 3A shows the compressible heel 130A in an uncompressed state. A side 150S of the workpiece is disposed at the transition/junction 142 between the central region 134 and the compressible heel 130A and as a result of being uncompressed, the entire compressible heel 130A can act against the side 150S of the workpiece.

Figure 3B:
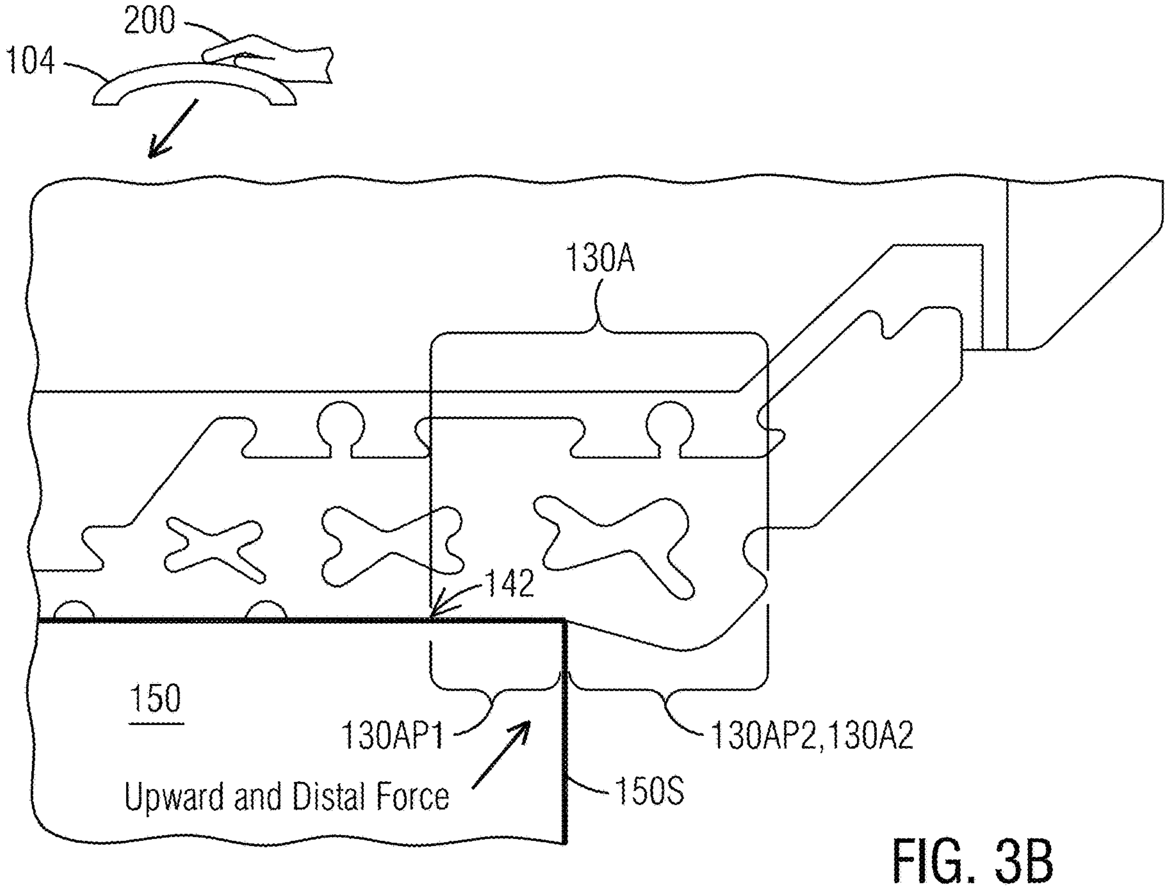
FIG. 3B is a side view of the compressible heel of FIG. 1A with a portion of the heel yielding upward and a remainder of the heel defining a secondary compressible heel.

FIG. 3B shows the compressible heel 130A in which a first portion 130A P1 of the compressible heel 130A is subjected to a sufficient upward and distal force and a second portion 130A P2 is not subjected to the sufficient upward and distal force. Only the first portion 130A P1 yields upward and distally to be flush with the central region 134. The second portion 130A P2 continues to protrude downward past the central region 134. The second portion 130A P2 thereby forms a secondary compressible heel 130A 2 that is configured to act against the side 150S of the workpiece. Because the entire compressible heel 130A is flexible, the side 150S of the workpiece 150 can be placed almost anywhere along the compressible heel 130A that leaves a second portion 130A P2 that will not compress with the first portion 130A P1 and will thereby act as the secondary compressible heel 130A 2. This eliminates the need to exactly position the pushblock 100 along the longitudinal axis 144.

In addition, the second compressible heel 130B can take any of the above configurations, independent of the configuration of the first compressible heel 130A.

Figure 4:
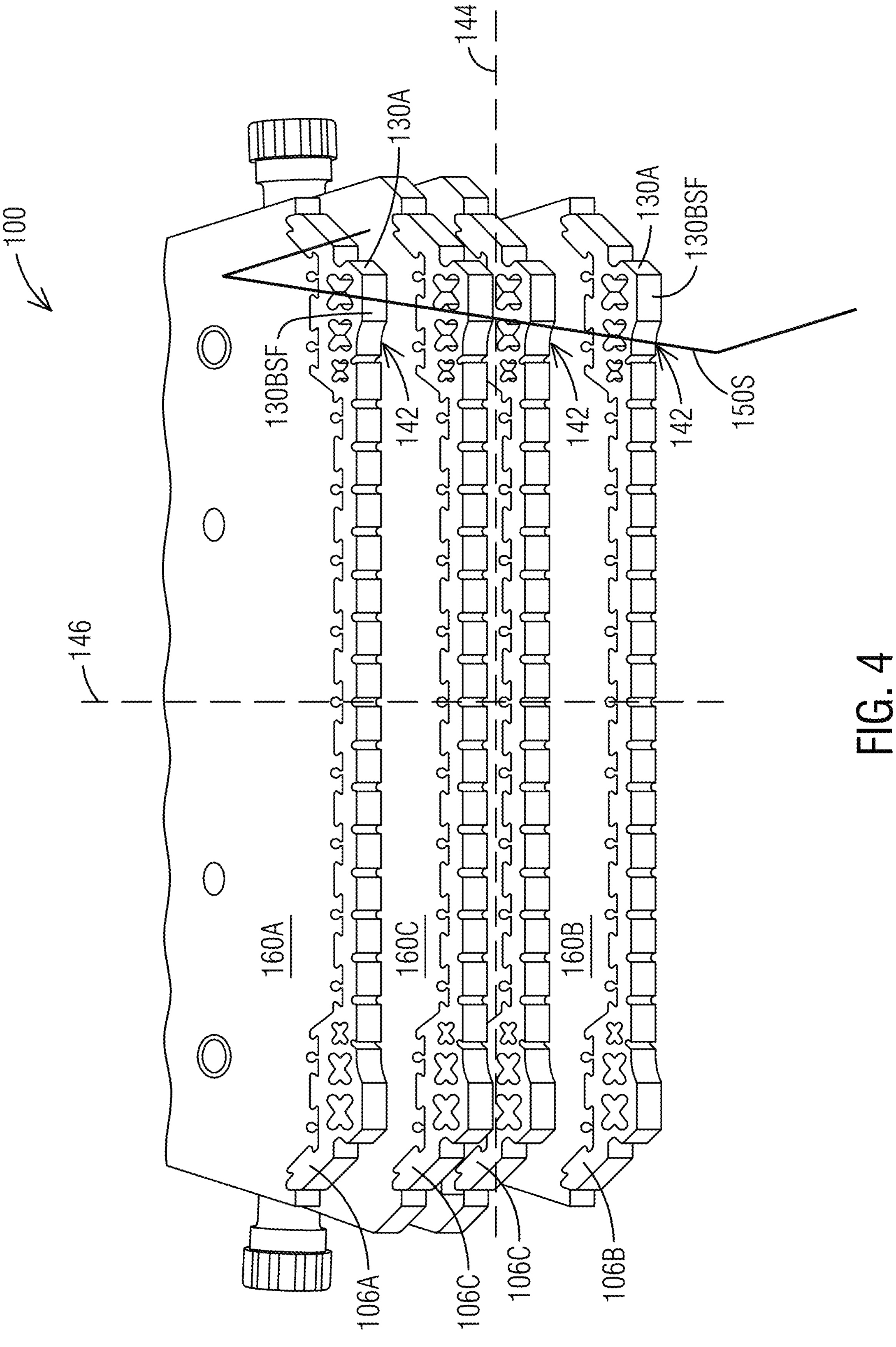
FIG. 4 is a perspective view of the pushblock of FIG. 1A.

FIG. 4 shows the pushblock 100 with the body 102 having a first leg 160A, a second leg 160B, and a center leg 160C. The first leg 160A has a respective pad 106A, the second leg 160B has a respective pad 106B, and the center leg 160C has two respective pads 106C. Each of the pads 106A, 106B, and 106C may be the same as the pad 106 described above. A lternately, each of the pads may 106A, 106B, and 106C vary within the spirit of the disclosure.

FIG. 4 further shows that a side 150S of the workpiece 150 need not be perpendicular to the longitudinal axis 144 nor parallel to the central plane 146. This is because of the flexibility in positioning the compressible heel 130A. For example, on the first leg 160A, the side 150S is disposed within the bottom surface flat portion 130BSF of the respective compressible heel 130A similar to the configuration shown in FIG. 3B. On the second leg 160B, the side 150S is disposed at the transition/junction 142 between the central region 134 and the respective compressible heel 130A similar to the configuration shown in FIG. 3A. As a result, for the first leg 160A a secondary compressible heel 130A 2 would be formed to act as a heel for the side 150S whereas for the second leg 160B the entire compressible heel 130A would be available to act as the heel. For the center leg 160C, progressively larger secondary compressible heels 130A 2 would be formed (in a direction toward the second leg 160B). This flexibility allows for misalignment between the longitudinal axis 144 and the side 150S. The flexibility also allows for a compressible heel 130A to be present and/or a secondary compressible heel 130A 2 to be formed for irregularly shaped (e.g., non-planar) side walls.

Figure 5A:
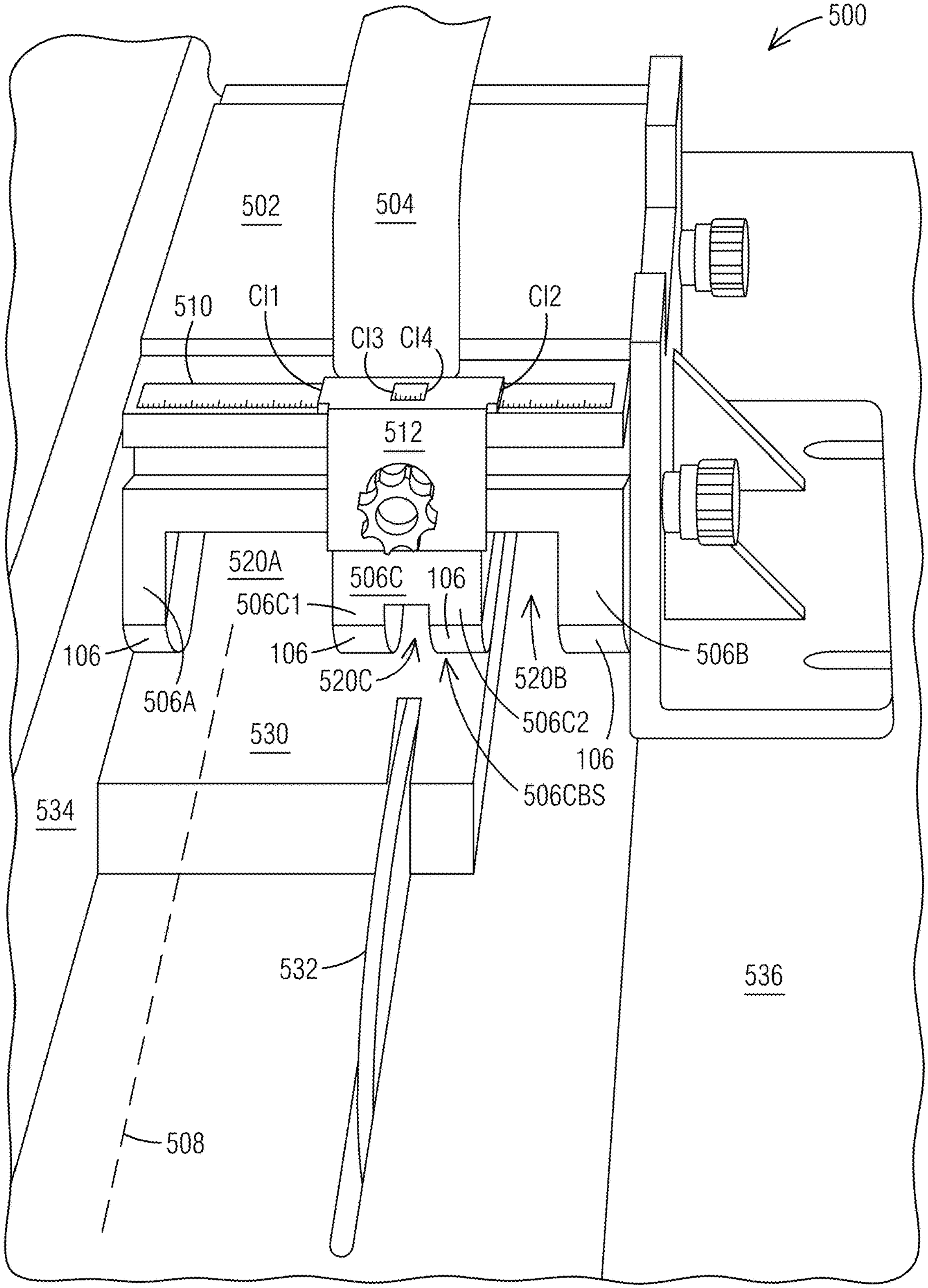
FIG. 5A and FIG. 5B are perspective views showing an example embodiment of a center leg having a tunnel of the pushblock of FIG. 1A.
Figure 5B:
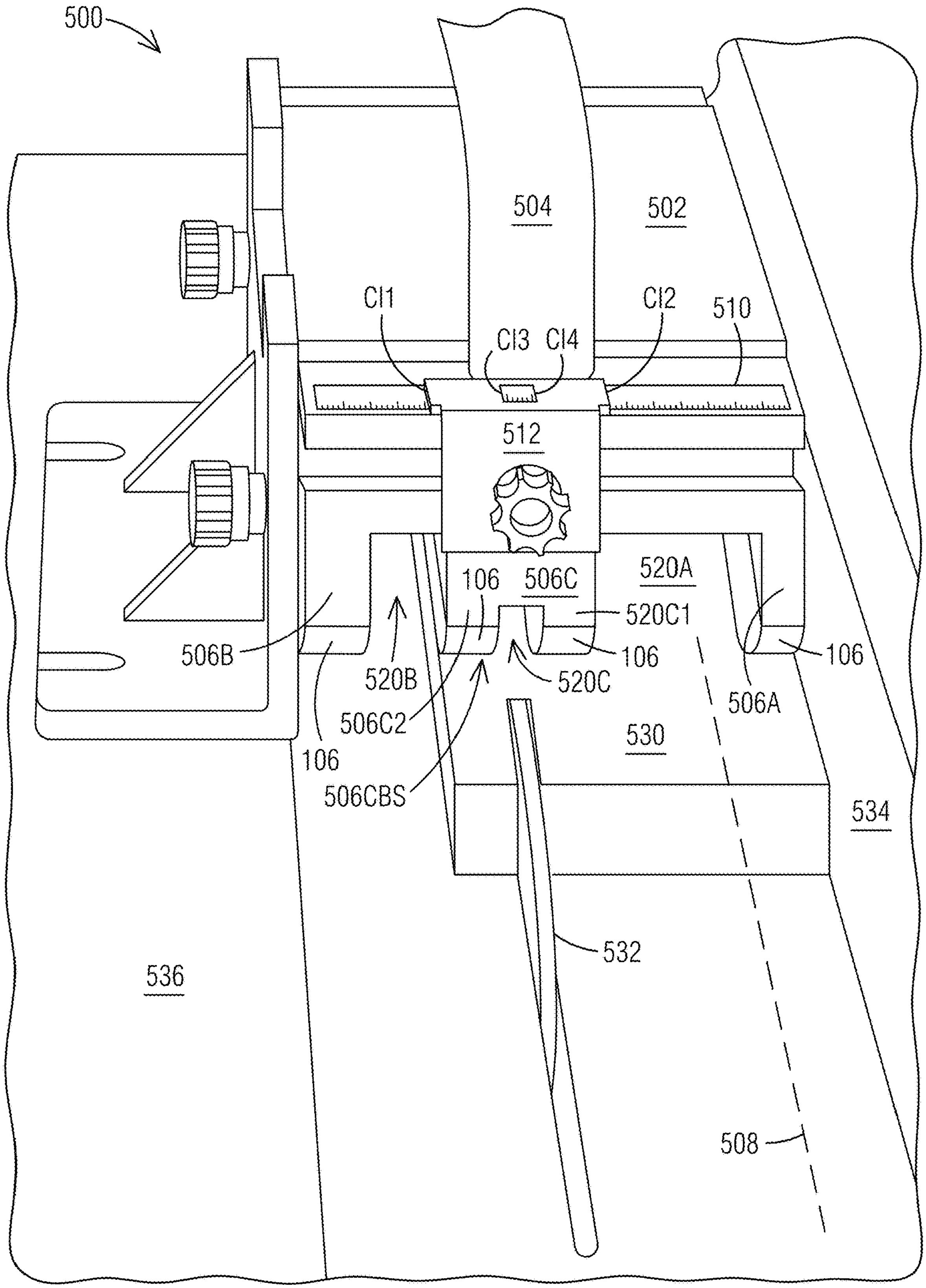

FIG. 5A and FIG. 5B show an example embodiment of a pushblock 500 that includes a body 502 and a handle 504 disposed atop the body 502. The body 502 includes a first leg 506A, a second leg 506B, and a center leg 506C, all of which extend along a longitudinal axis 508 of the pushblock 500. The center leg 506C is optionally adjustable side to side between the first leg 506A and the second leg 506B. The pushblock further includes a scale 510 and the center leg 506C includes a cursor 512 configured to cooperate with the scale 510 to indicate safe and unsafe cut dimensions for a given position of the center leg 506C. The pushblock 500 with the adjustable center leg 506C operates like that disclosed in U.S, U.S. Pat. No. 11,731,306 to Henry Wang, which is incorporated in its entirety herein by reference.

Similar to the cursor 162 in 11,731,306, the cursor 512 herein includes two cursor indicators CI1 and CI2. In 11,731,306, dimensions between CI1 and CI2 indicate unsafe cut width settings for the table saw. The indicated cut width dimensions are unsafe because the saw blade 110 would cut into the center leg 140 when the leg 130 abuts the fence 106 of the table saw 108 during use. All the dimensions between CI1 and CI2 are unsafe because the center leg 140 is a solid leg that extends all the way down to the workpiece 104 and across the entire width (from CI1 to CI2) of the center leg 140.

In contrast, the center leg 506C disclosed herein includes its own center tunnel 520C that is recessed into a bottom surface 506CBS of the center leg and that extends along the longitudinal axis 508 as do the first tunnel 520A and the second tunnel 520B. Having this center tunnel 520C increases the amount of safe cut width settings available to a user by reducing the footprint of the center leg 506C on the workpiece 530. Reducing the footprint reduces the amount of the center leg 506C that is susceptible to being damaged by the saw blade 532 when the first leg 506A abuts a fence 534 of the table saw 536.

Specifically, the cursor 512 includes two additional cursor indicators CI3 and CI4. Dimensions visible between CI3 and CI4 correspond to a location of the center tunnel 520 C when the first leg 506A abuts a fence 534 of the table saw 536 during use and thereby indicate cut width settings for the table saw 536 that are safe. These cut width settings are safe because the saw blade 532 would be disposed in the center tunnel 520C and thereby would not cut into the center leg 506C. Cut width settings from CI1 to CI3 indicate cut width settings for the table saw 536 that are unsafe because the saw blade 532 would cut into subleg 506C 1 of the center leg 506C. Cut width settings from CI2 to CI4 indicate cut width settings for the table saw 536 that are unsafe because the saw blade 532 would cut into subleg 506C2 of the center leg 506C.

Each leg 506A, 506B, and each subleg 506C1, 506C2 may have a respective pad 106 as described above. The pads 106 may be the same as each other or may vary within the scope of this disclosure.

As has been disclosed above, the present inventor has devised an apparatus with features that are improvements in the art. A II features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

Various embodiments may be understood more readily by reference to the above detailed description. Unless defined otherwise, all technical and scientific terms used herein have the same meaning as commonly understood by one of ordinary skill in the art to which this disclosure belongs.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The invention claimed is:

1. A woodworking pushblock, comprising:

a body that extends along a longitudinal axis and a handle disposed atop the body;

wherein the body comprises a first leg, a second leg, and a center leg disposed therebetween, wherein the first leg, the second leg, and the center leg are each configured to abut a top of a workpiece; and wherein the first leg and the center leg define a first tunnel therebetween, wherein the second leg and the center leg define a second tunnel therebetween, wherein the center leg defines a center tunnel recessed into a bottom surface thereof and disposed between the first tunnel and the second tunnel;

wherein the first leg and the second leg each comprise a respective pad configured to abut the top of the workpiece;

wherein each pad comprises: a compressible heel composed of a compressible material and comprising a heel bottom surface configured to contact the workpiece, and a central region comprising the compressible material and at least one contact area configured to contact the workpiece;

wherein when the compressible heel and the central region are in an uncompressed state, the compressible heel protrudes downward past the at least one contact area of the central region;

wherein the compressible heel is configured such that any portion of the compressible heel subjected to a sufficient upward force applied to the heel bottom surface yields upward at least until flush with the at least one contact area of the central region while any remainder of the compressible heel that is not subjected to the sufficient upward force protrudes downward past the at least one contact area of the central region;

wherein the compressible heel comprises a heel through-hole that is configured to collapse upward as the compressible heel yields upward;

wherein a perimeter of the heel through-hole defines an X-shape that comprises a first leg and a second leg; and wherein when the compressible heel yields upward, the first leg and the second leg both narrow.

2. The woodworking pushblock of claim 1, wherein the center leg is adjustable side to side between the first leg and the second leg.

3. The woodworking pushblock of claim 1, wherein the center leg comprises a first subleg configured to abut the top of the workpiece and a second subleg configured to abut the top of the workpiece; and wherein the center tunnel is disposed between the first subleg and the second subleg.

4. The woodworking pushblock of claim 3, wherein the first subleg and the second subleg each comprise a respective subleg pad configured to abut the top of the workpiece;

wherein each subleg pad comprises a respective compressible heel composed of a compressible material and a respective central region;

wherein when the compressible heel and central region of a respective subleg pad is in an uncompressed state, the compressible heel protrudes downward past the central region; and wherein the compressible heel of the respective subleg pad is configured such that any portion of the compressible heel subjected to a sufficient upward force applied to a heel bottom surface of the compressible heel yields upward at least until flush with the central region while any remainder of the compressible heel that is not subjected to the sufficient upward force protrudes downward past the central region.

5. The woodworking pushblock of claim 1, further comprising a scale disposed on the body; and a cursor configured to move with the center leg;

wherein the cursor indicates unsafe cut dimensions.

6. The woodworking pushblock of claim 1, wherein each pad comprises the compressible heel on a first side of the central region and a further compressible heel on a second side of the central region that is opposite the first side; and wherein when the compressible heel, the further compressible heel, and the central region are all in an uncompressed state and when the compressible heel and the further compressible heel are resting on a workpiece, the compressible heel and the further compressible heel are configured to hold the at least one contact area apart from the workpiece.

7. The woodworking pushblock of claim 1, wherein maximum thickness of the pad in the central region is less than an overall thickness of the pad at the compressible heel.

* * * * *